United States Patent
Leppänen et al.

(10) Patent No.: US 12,001,644 B2
(45) Date of Patent: Jun. 4, 2024

(54) METHOD AND APPARATUS FOR ADDING INTERACTIVE OBJECTS TO A VIRTUAL REALITY ENVIRONMENT

(71) Applicant: Nokia Technologies Oy, Espoo (FI)

(72) Inventors: Jussi Leppänen, Tampere (FI); Arto Lehtiniemi, Lempäälä (FI); Antti Eronen, Tampere (FI); Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 71 days.

(21) Appl. No.: 17/258,634

(22) PCT Filed: Jul. 12, 2019

(86) PCT No.: PCT/EP2019/068821
§ 371 (c)(1),
(2) Date: Jan. 7, 2021

(87) PCT Pub. No.: WO2020/020665
PCT Pub. Date: Jan. 30, 2020

(65) Prior Publication Data
US 2021/0286503 A1    Sep. 16, 2021

(30) Foreign Application Priority Data
Jul. 24, 2018    (EP) .................................... 18185181

(51) Int. Cl.
*G06F 3/04815*    (2022.01)
*G06F 3/01*    (2006.01)
*G06F 3/0484*    (2022.01)

(52) U.S. Cl.
CPC .......... *G06F 3/04815* (2013.01); *G06F 3/013* (2013.01); *G06F 3/0484* (2013.01);
(Continued)

(58) Field of Classification Search
CPC .... G06F 3/04815; G06F 3/0484; G06F 3/011; G06F 3/012; G06F 3/013; G06F 3/016;
(Continued)

(56) References Cited

U.S. PATENT DOCUMENTS 9,766,806 B2    9/2017    Bennet et al.
9,996,797 B1    6/2018    Holz et al.
(Continued)

OTHER PUBLICATIONS

Extended European Search Report received for corresponding European Patent Application No. 18185181.7, dated Dec. 20, 2018, 8 pages.
(Continued)

*Primary Examiner* — Asher D Kells
(74) *Attorney, Agent, or Firm* — Harrington & Smith

(57) ABSTRACT

An apparatus, method and computer program is described comprising adding an interactive object to an interactive object queue in response to a user indication to add the interactive object to the queue, providing a first control area corresponding to the interactive object in response to the interactive object being added to the interaction object queue, wherein the first control area is accessible to the user, determining whether the user is within the first control area, providing at least one feedback to the user in response to determining that the user is within the first control area, and receiving an interaction input from the user for interacting with the interactive object.

20 Claims, 12 Drawing Sheets

(52) U.S. Cl.
CPC .............. *G06F 3/012* (2013.01); *G06F 3/016* (2013.01); *G06F 3/017* (2013.01)

(58) Field of Classification Search
CPC .............. G06F 3/017; A63F 2300/8082; A63F 13/525–5258; A61B 2090/365; H04N 13/344; G06K 9/00671; G06T 19/006; G02B 27/01; G02B 27/017–0176; G02B 27/0093; G02B 2027/0174–0178; G06V 20/20
See application file for complete search history.

(56) References Cited

U.S. PATENT DOCUMENTS

| | | | | |
|---|---|---|---|---|
| 2009/0208052 | A1* | 8/2009 | Kaplan | G06F 3/011 382/103 |
| 2012/0113223 | A1 | 5/2012 | Hilliges et al. | |
| 2013/0227454 | A1* | 8/2013 | Thorsander | G06F 40/166 715/767 |
| 2013/0257692 | A1* | 10/2013 | Yang | G06F 3/011 715/849 |
| 2014/0002444 | A1* | 1/2014 | Bennett | G06T 19/006 345/419 |
| 2014/0368535 | A1 | 12/2014 | Salter et al. | |
| 2014/0375683 | A1* | 12/2014 | Salter | G02B 27/0172 345/633 |
| 2016/0025981 | A1* | 1/2016 | Burns | G06F 3/04815 345/156 |
| 2016/0049013 | A1* | 2/2016 | Tosas Bautista | G06T 19/006 345/633 |
| 2016/0296838 | A1 | 10/2016 | Goetgeluk et al. | |
| 2017/0109936 | A1* | 4/2017 | Powderly | G06F 3/017 |
| 2018/0004283 | A1* | 1/2018 | Mathey-Owens | G06F 3/04842 |

OTHER PUBLICATIONS

International Search Report and Written Opinion received for corresponding Patent Cooperation Treaty Application No. PCT/EP2019/068821, dated Sep. 9, 2019, 11 pages.
Office action received for corresponding European Patent Application No. 18185181.7, dated May 12, 2021, 6 pages of office action.
Office action received for corresponding European Patent Application No. 18185181.7, dated Feb. 22, 2022, 6 pages.

* cited by examiner

METHOD AND APPARATUS FOR ADDING INTERACTIVE OBJECTS TO A VIRTUAL REALITY ENVIRONMENT

RELATED APPLICATION

This application claims priority to PCT Application No. PCT/EP2019/068821, filed on Jul. 12, 2019, which claims priority to European Application No. 18185181.7, filed on Jul. 24, 2018, each of which is incorporated herein by reference in its entirety.

FIELD

The present specification relates to interaction with interactive objects, for example in a virtual reality, augmented reality or mixed reality environment.

BACKGROUND

Virtual reality (VR) is a rapidly developing area of technology in which video content is provided to a VR display system. As is known, a VR display system may be provided with a live or stored feed from a video content source, the feed representing a VR space or world for immersive output through the display system. In some embodiments, audio is provided, which may be spatial audio. A VR headset may be configured to provide VR video and audio content to the user, e.g. through the use of a pair of video screens and headphones incorporated within the headset. Mixed reality (MR) is an area of technology in which real and virtual worlds are combined such that physical and digital objects co-exist and interact in real time. Augmented reality (AR) refers to a real-world view that is augmented by computer-generated sensory input. In the context of the present specification, the term mixed reality is intended to encompass augmented reality.

Interactive objects may be provided, for example, in virtual reality, augmented reality or mixed reality scenes. Interaction with interactive objects may be cumbersome as a user may need to look at the interactive object and/or use a controller to engage with the interactive object.

SUMMARY

In a first aspect, this specification provides an apparatus comprising: means for adding an interactive object to an interactive object queue in response to a user indication to add the interactive object to the queue; means for providing a first control area corresponding to the interactive object in response to the interaction object being added to the interactive object queue, wherein the first control area is accessible to the user; means for determining whether the user is at least partially within the first control area; means for providing feedback (such as haptic feedback) to the user in response to determining that the user is at least partially within the first control area; and means for receiving an interaction input from the user for interacting with the interactive object.

The means for adding the interactive object to the interactive object queue may comprise means for determining a user gaze towards the interactive object, wherein the user gaze is the said user indication. The means for determining the user gaze may determine whether the interactive object is in a field of vision of the user for at least a first threshold time period and/or a distance between the user and the interactive object is lower than a first threshold distance.

A position of the first control area may, for example, be determined based on the user's position.

The first control area may be provided such that the first control area does not overlap with any existing control area.

Some embodiments may comprise means for removing at least one interactive object from the interactive object queue. The at least one interactive object may, for example, be removed when the user does not interact with the at least one interactive object for a second threshold time period.

Some embodiments may comprise means for providing a visual representation of the interactive object to the user. A size of the visual representation of the interactive object may be increased when adding the interactive object to the interactive object queue.

Some embodiments may comprise means for providing visual representation of the first control area to the user.

There may be provided means for notifying the user when the interactive object is added to the interactive object queue.

Some embodiments may comprise means for receiving a rejection input from the user within a third threshold time period after adding the at least one interactive object to the interactive object queue and means for removing the interactive object from the interactive object queue on receipt of the rejection input.

In some forms of the invention, the means may comprise at least one processor; and at least one memory including computer program code, the at least one memory and the computer program code configured, with the at least one processor, to cause the performance of the apparatus.

In a second aspect, this specification describes an apparatus comprising: means for providing a user indication to add an interactive object to an interactive object queue; means for receiving at least one feedback (such as haptic feedback) in response to the user being at least partially within a first control area, wherein the first control area corresponds to the interactive object, wherein the first control area is provided in response to the interactive object being added to the interactive object queue; and means for providing an interaction input from the user for interacting with the interactive object.

In a third aspect, this specification describes a method comprising: adding an interactive object to an interactive object queue in response to a user indication to add the interactive object to the queue; providing a first control area corresponding to the interactive object in response to the interaction object being added to the interactive object queue, wherein the first control area is accessible to the user; determining whether the user is at least partially within the first control area; and providing at least one feedback to the user in response to determining that the user is at least partially within the first control area.

In a fourth aspect, this specification describes a method comprising: providing a user indication to add an interactive object to an interactive object queue; receiving at least one feedback (such as haptic feedback) in response to the user being at least partially within a first control area, wherein the first control area corresponds to the interactive object, wherein the first control area is provided in response to the interactive object being added to the interactive object queue; and providing an interaction input from the user for interacting with the interactive object.

Adding the interactive object to the interactive object queue may comprise determining a user gaze towards the interactive object, wherein the user gaze is the said user indication. The means for determining the user gaze may determine whether the interactive object is in a field of vision of the user for at least a first threshold time period and/or a distance between the user and the interactive object is lower than a first threshold distance.

The first control area may be provided such that the first control area does not overlap with any existing control area.

Some embodiments may comprise removing at least one interactive object from the interactive object queue. The at least one interactive object may, for example, be removed when the user does not interact with the at least one interactive object for a second threshold time period.

Some embodiments may comprise providing a visual representation of the interactive object to the user. A size of the visual representation of the interactive object may be increased when adding the interactive object to the interactive object queue. Alternatively, or in addition, some embodiments may comprise providing visual representation of the first control area to the user.

Some embodiments may comprise receiving a rejection input from the user within a third threshold time period after adding the at least one interactive object to the interactive object queue and removing the interactive object from the interactive object queue on receipt of the rejection input.

In a fifth aspect, this specification describes an apparatus configured to perform any method as described with reference to the third or fourth aspects.

In a sixth aspect, this specification describes computer-readable instructions (e.g. provided on a computer readable medium, such as a non-transitory computer readable medium) which, when executed by computing apparatus, cause the computing apparatus to perform any method as described with reference to the third or fourth aspects.

In a seventh aspect, this specification describes a computer program comprising instructions for causing an apparatus to perform at least the following: add an interactive object to an interactive object queue in response to a user indication to add the interactive object to the queue; provide a first control area corresponding to the interactive object in response to the interactive object being added to the interactive object queue, wherein the first control area is accessible to the user; determine whether the user is at least partially within the first control area; and provide at least one feedback to the user in response to determining that the user is at least partially within the first control area. The computer program may further comprise instructions for causing an apparatus to receive an interaction input from the user for interacting with the interactive object.

In an eighth aspect, this specification describes a computer readable medium (e.g. a non-transitory computer-readable medium) comprising program instructions stored thereon for performing at least the following: adding an interactive object to an interactive object queue in response to a user indication to add the interactive object to the queue; providing a first control area corresponding to the interactive object in response to the interactive object being added to the interactive object queue, wherein the first control area is accessible to the user; determining whether the user is at least partially within the first control area; and providing at least one feedback to the user in response to determining that the user is at least partially within the first control area. The computer readable medium may further comprise program instruction stored thereon for receiving an interaction input from the user for interacting with the interactive object.

BRIEF DESCRIPTION OF THE DRAWINGS

Example embodiments are described herein, by way of non-limiting examples, with reference to the following schematic drawings, in which.

DETAILED DESCRIPTION

Figure 1:
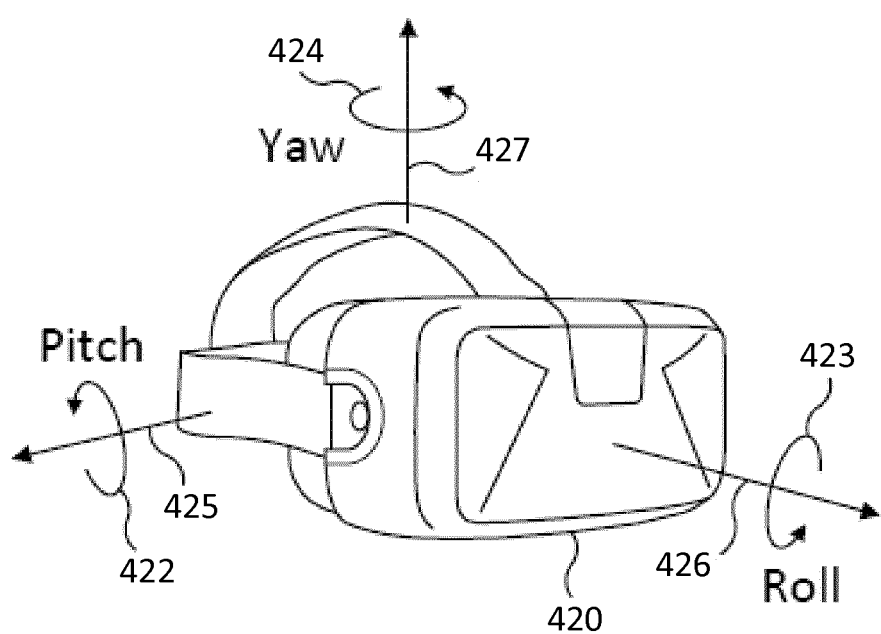
FIG. 1 shows a virtual reality or augmented reality headset.

FIG. 1 shows a virtual reality or augmented reality headset 420, for displaying visual data for a virtual reality or augmented reality space. The headset 420 may comprise augmented reality (AR) glasses, which may enable visual content, for example one or more virtual objects, to be projected or displayed on top of a see-through portion of the glasses.

The headset 420 receives the virtual reality or augmented reality content data, for example from a media player (not shown). Here, the media player may comprise a mobile phone, smartphone or tablet computer configured to play content through its display. For example, the media player may be a touchscreen device having a large display over a major surface of the device, through which video content can be displayed. The media player may be inserted into a holder of a headset 420. With such headsets 420, a smart phone or tablet computer may display visual data which is provided to a user's eyes via respective lenses in the headset 420. The visual data may be provided as a stereoscopic display where the two slightly different angles of the visual scene is displayed to each eye.

The headset 420 may include means for determining the spatial position of the user and/or orientation of the user's head. This may be by means of determining the spatial position and/or orientation of the headset 420. Over successive time frames, a measure of movement may therefore be calculated and stored. For example, the headset 420 may incorporate motion tracking sensors which may include one or more of gyroscopes, accelerometers and structured light systems. These sensors may generate position data from which a current visual field-of-view (FOV) is determined and updated as the user, and so the headset 420, changes position and/or orientation. The headset 420 may comprise two digital screens for displaying stereoscopic video images of the virtual world in front of respective eyes of the user, and also two speakers for delivering audio, if provided. The example embodiments herein are not limited to a particular type of headset 420.

In some example embodiments, the spatial position and/or orientation of the user's head may be determined using a six degrees of freedom (6DoF) method. As shown in FIG. 1, these include measurements of pitch 422, roll 423 and yaw 424 and also translational movement in Euclidean space along side-to-side, front-to-back and up-and-down axes 425, 426 and 427. (The use of a six-degrees of freedom headset is not essential. For example, a three-degrees of freedom headset could readily be used.)

The display system 420 may be configured to display virtual reality or augmented reality content data to the user based on spatial position and/or the orientation of the headset 420. A detected change in spatial position and/or orientation, i.e. a form of movement, may result in a corresponding change in the visual data to reflect a position or orientation transformation of the user with reference to the space into which the visual data is projected.

This allows virtual reality content data to be consumed with the user experiencing a 3D virtual reality or augmented reality environment.

Correspondingly, the detected change in spatial position and/or orientation may result in a corresponding change in the audio data played to the user to reflect a position or orientation transformation of the user with reference to the space where audio data is located. Modifications such as level and position changes are done to audio playback properties of sound objects to correspond to the transformation. For example, when the user rotates his head the positions of sound objects are rotated accordingly to the opposite direction so that, from the perspective of the user, the sound objects appear to remain at a constant position in the virtual world. As another example, when the user walks farther away from an audio object, its gain or amplitude may be lowered accordingly inversely proportionally to the distance as would approximately happen in the real world when user walks away from a real, physical sound emitting object.

User interaction in virtual reality, augmented reality, or mixed reality environments can be cumbersome. Interaction, for example pressing buttons or moving sliders, in typical virtual reality, augmented reality, or mixed reality environments requires the user to look at an interaction element and then perform the relevant interaction. Looking at an interaction element may be more difficult in virtual reality environments compared to the real world because of technical limitations of virtual reality experiencing devices, for example. A typical example is the limited field of view (FOV) of head mounted displays (HMD) which makes it more difficult to visually locate an object. The interaction may, for example, be performed using a controller or a gesture. In some scenarios, the user might not be looking at the interaction element, despite wanting to perform an interaction.

Figure 2:
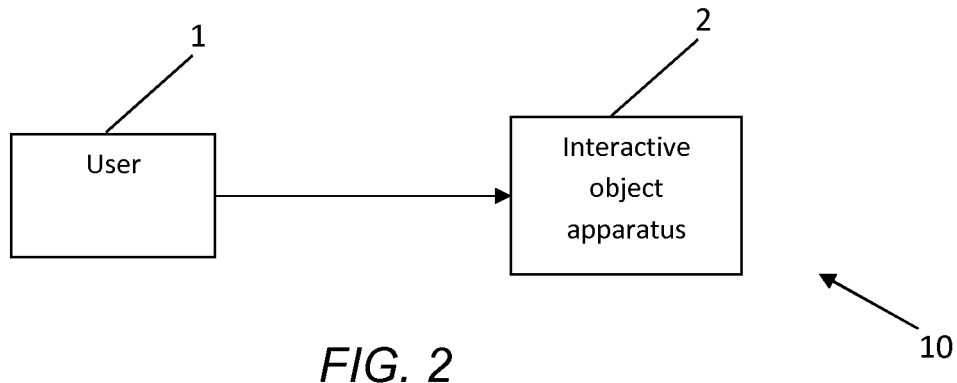
FIG. 2 is a block diagram in accordance with an example embodiment.

FIG. 2 is a block diagram, indicated generally by the reference numeral 10, in accordance with an example embodiment, in which a user 1 interacts with an interactive object apparatus 2. The interactive object apparatus 2 may be a virtual reality apparatus, augmented reality apparatus, and/or mixed reality apparatus. The user 1 may send user indications and/or interaction inputs to the interactive object apparatus 2 in order to interact with one or more interactive objects provided by the interactive object apparatus 2. The term "virtual reality" may be used in the specification herein to represent virtual reality, augmented reality, and/or mixed reality.

Figure 3:
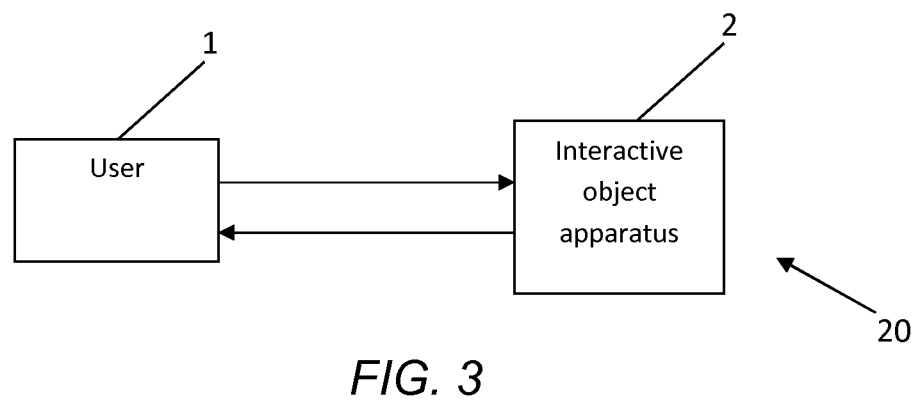
FIG. 3 is a block diagram in accordance with an example embodiment.

FIG. 3 is a block diagram, indicated generally by the reference numeral 20, in accordance with an example embodiment. In response to the user 1 sending user indications to the interactive object apparatus 2, the interactive object apparatus 2 provides means for the user 1 to interact with the one or more interactive objects. The user 1 is then capable of interacting with the one or more interactive objects. The one or more interactive objects may be added to interactive object queues by the interactive object apparatus 2, such that a control area is provided for user 1 to interact with the one or more interactive objects. The interaction may be performed in various ways, which are discussed in greater detail below.

Figure 4:
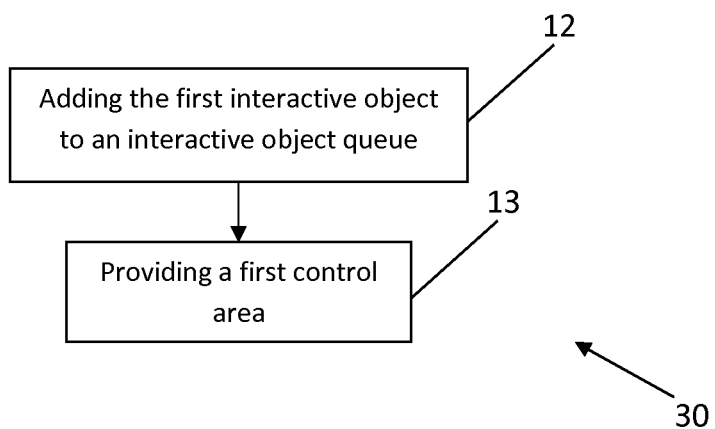
FIG. 4 is a flow chart showing an algorithm in accordance with an example embodiment.

FIG. 4 is a flow chart showing an algorithm, indicated generally by the reference numeral 30, in accordance with an example embodiment. At operation 12, a first interactive object is added to an interactive object queue. At operation 13, a first control area is provided to the user 1 in response to the interactive object being added to the interactive object queue. The first control area corresponds to the first interactive object. The first interactive object may be added to the interactive object queue in response to a user indication. For example, the interactive object queue may comprise interactive objects that the user 1 is most likely to use. There may be a plurality of interactive objects in a virtual reality environment. Not all of the plurality of interactive objects provided may be important to the user, or may be likely to be used by the user 1 in the near future. Furthermore, the user 1 may prefer to have some interactive objects in the interactive objects queue in order to make it easier to interact with those objects.

Figure 5:
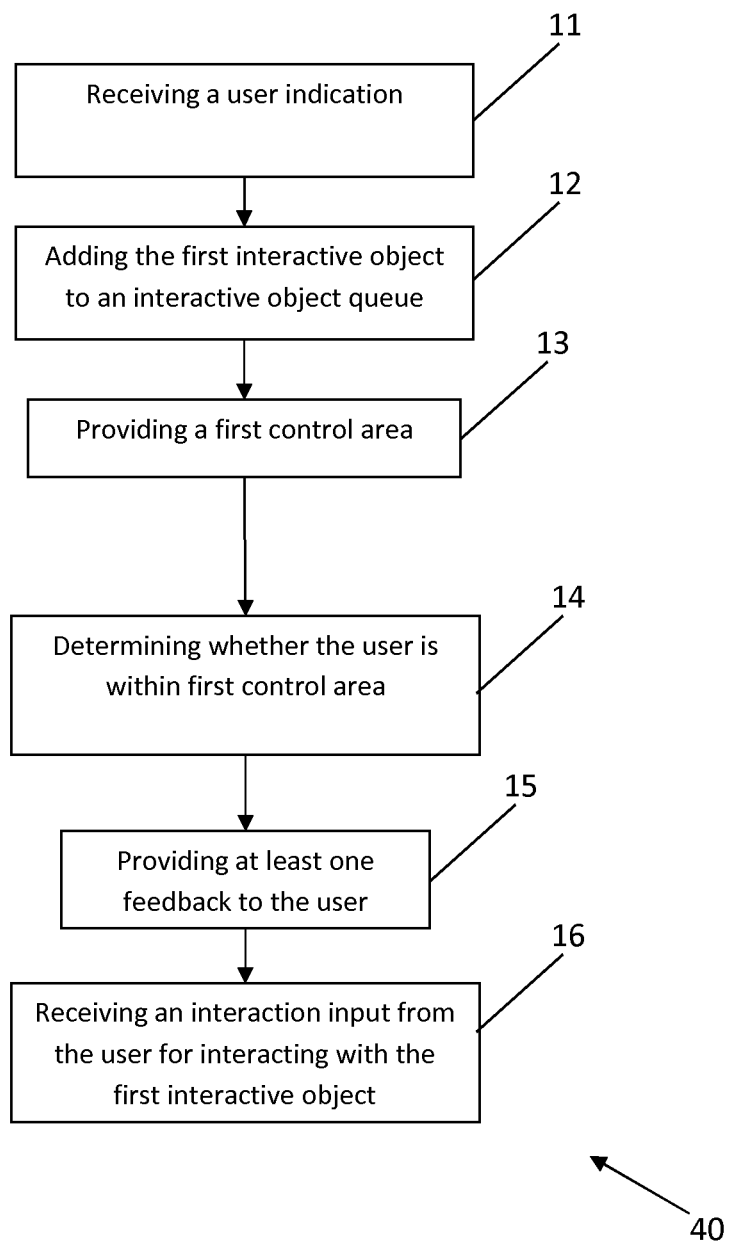
FIG. 5 is a flow chart showing an algorithm in accordance with an example embodiment.

FIG. 5 is a flow chart showing an algorithm, indicated generally by the reference numeral 40, in accordance with an example embodiment. The algorithm 40 includes the operations 12 and 13 described above.

At operation 11 of the algorithm 40, the interactive object apparatus 2 receives a user indication from the user 1. At operation 12, in response to the user indication, a first interactive object is added to an interactive object queue. At operation 13, a first control area is provided. The first control area corresponds to the first interactive object, such that when the user 1 is fully or partially present within the first control area, user 1 is able to interact with the first interactive object. At operation 14, the interactive object apparatus 2 determines whether user 1 is at least partially within the first control area. If it is determined that the user 1 is at least partially within the first control area, at least one feedback is provided to the user 1 at operation 15. At operation 16, an interaction input is received from the user 1 for interacting with the first interactive object.

The first control area may be modified according to the position of the user 1. As such, if user 1 moves, the first control area may be modified in order to ensure that user 1 is still able to interact with the first interactive object, regardless of the position of the user 1.

In one example, the user indication (such as the user indication ii) may be a gesture, such as a hand gesture, eye movement, body movement, or the like. Examples of potential hand gestures include hovering on top of an object, pointing towards an object, or clapping hands.

Examples of eye movements include gazing at an object or blinking eyes. Examples of body movement include translational movement towards an object with a bodily part. The user indication may also be an audio input such as spoken utterance containing a predetermined keyword, whistling, or the like. Alternatively, the user indication may be an instruction that has been previously received from the user 1. In one example, the user indication is received when the interactive object is within the field of vision of the user for a first threshold time period. In one example, the user indication is received when the distance between the user and the interactive object is below a first threshold distance.

For example, if the whole body of the user 1 is within the first control area, the user may be fully within the first control area. If some, but not all parts of the user's body are within the first control area, the user 1 may be partially within the first control area.

In another example, the user 1 may use a controller to interact with the interactive object apparatus 2. At operation 14, it may be determined whether the user 1 is pointing the controller towards the first interactive object within the first control area. The feedback may be provided to the user 1 at operation 15 if the user 1 is pointing the controller towards the first interactive object.

In one example, the at least one feedback (operation 15 in the example described above) may include one or more of: audio notification, visual notification, and/or haptic notification. For example, when the user is within the first control area, the interactive object apparatus 2 may provide an audio notification by indicating that the user 1 is within the first control area. Alternatively, the interactive object apparatus 2 may provide a visual notification, such as flashing lights, a notification in the user view, changes to a first interactive object view provided in the user view, or the like, that may indicate to the user 1 that the user is within the first control area. Alternatively, when the user 1 is using a controller the user 1 may feel a haptic feedback through the controller when the user 1 points the controller towards the first interactive object. It will be appreciated that there may be various ways of providing a feedback to the user in order to indicate that the user 1 is now capable of interacting with the first interactive object (including a combination of two or more of the options set out above).

In one example, the interaction input is received from the user 1, such that the user 1 is now interacting with the first interactive object. For example, if the user 1 wishes to execute an action corresponding to the first interactive object, the user 1 may send the interaction input to the interactive object apparatus 2. The interaction input may be a gesture, a sequence of gestures, using a specific button, movement, or sequence of buttons and/or movements on the controller, an audio input, or the like. The gestures may include, but are not limited to, hand gestures, eye movements, body movements, or the like.

Figure 6:
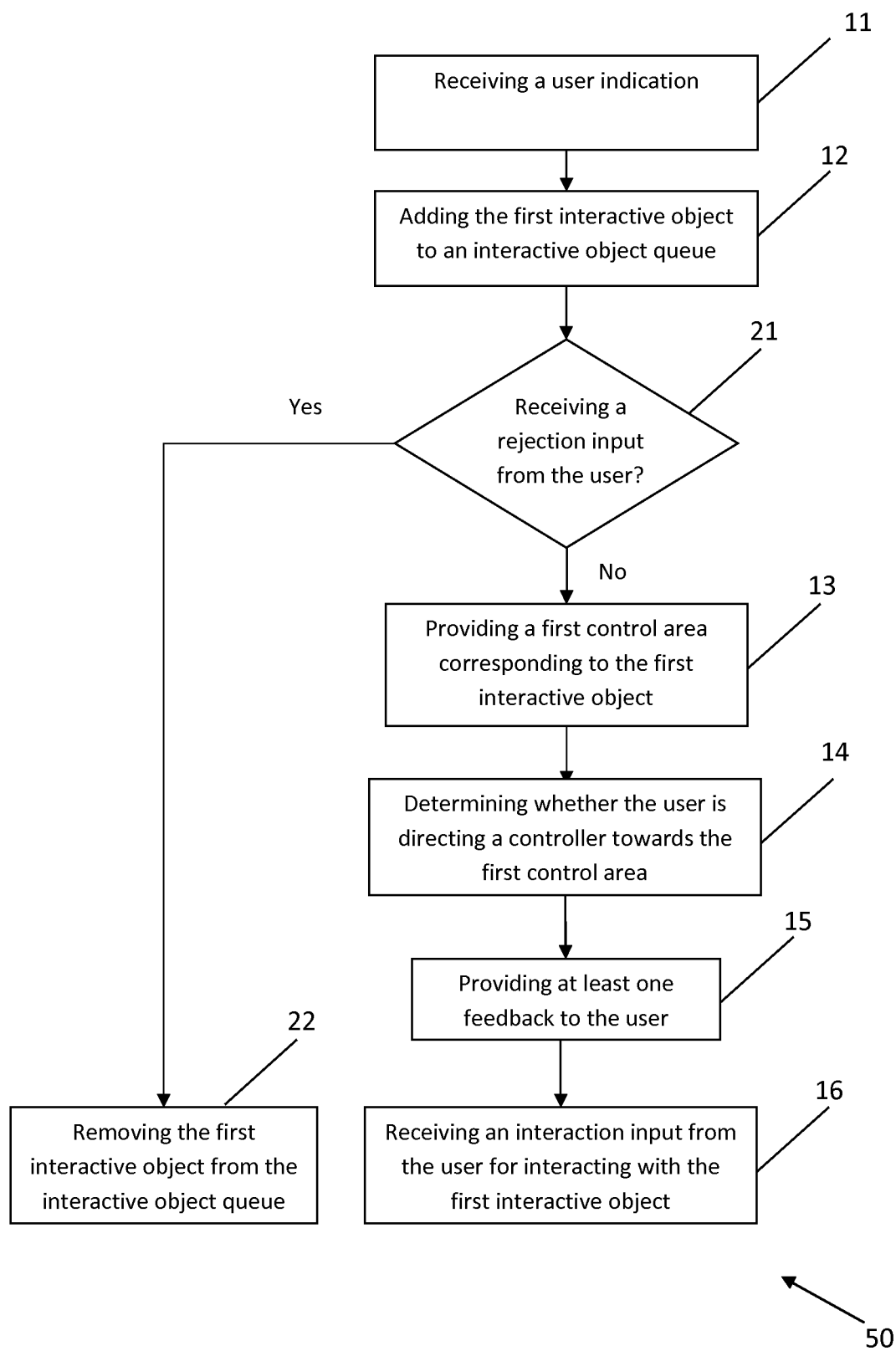
FIG. 6 is a flow chart showing an algorithm in accordance with an example embodiment.

FIG. 6 is a flow chart showing an algorithm, indicated generally by the reference numeral 40, in accordance with an example embodiment. Operations 11-16 are similar to operations 11-16 of algorithm 40.

At operation 21, after adding the first interactive object to the interactive object queue (operation 12 described above), the interactive object apparatus 2 determines whether a rejection input is received from the user 1. If a rejection input is received, the first interactive object is removed from the interactive object queue (at operation 22). If not, the algorithm 20 moves to the operation 13 described above such that operations 13 to 16 are executed.

The user 1 may, for example, send a rejection input (operation 21), if the user 1 does not wish to keep the first interactive object in the interactive object queue. For example, the user 1 may have mistakenly sent the user indication at operation 11, and may not have deliberately added the first interactive object to the interactive object queue. Therefore, the user 1 may remove the first interactive object from the interactive object queue by sending the rejection input. The rejection input may be a gesture, a sequence of gestures, using a specific button, movement, or sequence of buttons and/or movements on the controller, an audio input, or the like.

In one example, the rejection input (operation 21) may be received if the first interactive object has not been interacted with for at least a second threshold time period. In another example, the rejection input may be received based on a location of the user. For example, if a distance between the user and the first interactive object is determined to be more than a first threshold distance, the rejection input is received and the first interactive object is removed from the interactive object queue (operation 22). Alternatively, or in addition, if the distance between the user and the first interactive object is determined to be more than the first threshold distance at the time when the user indication is received (operation 11), the rejection input is received and the first interactive object is removed from the interactive object queue. Alternatively, or in addition, if the user is determined to be at a particular rejection location after the first interactive object has been added to the interactive object queue, the rejection input is received and the first interactive object is removed from the interactive object queue.

In one example, when an interactive object is added to the interactive object queue, the user is notified. The notification may be one or more of: audio notification, visual notification, and/or haptic notification. For example, when the user is notified with a visual notification, a size of a visual representation of the interactive object may be increased when adding the interactive object to the interactive object queue.

Figure 7A:
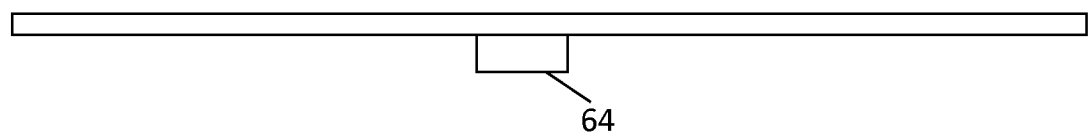
FIG. 7A (top view) and FIG. 7B (user view) show representations of a scene in accordance with an example embodiment.
Figure 7A:
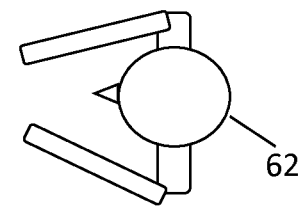
Figure 7A:
Figure 7B:
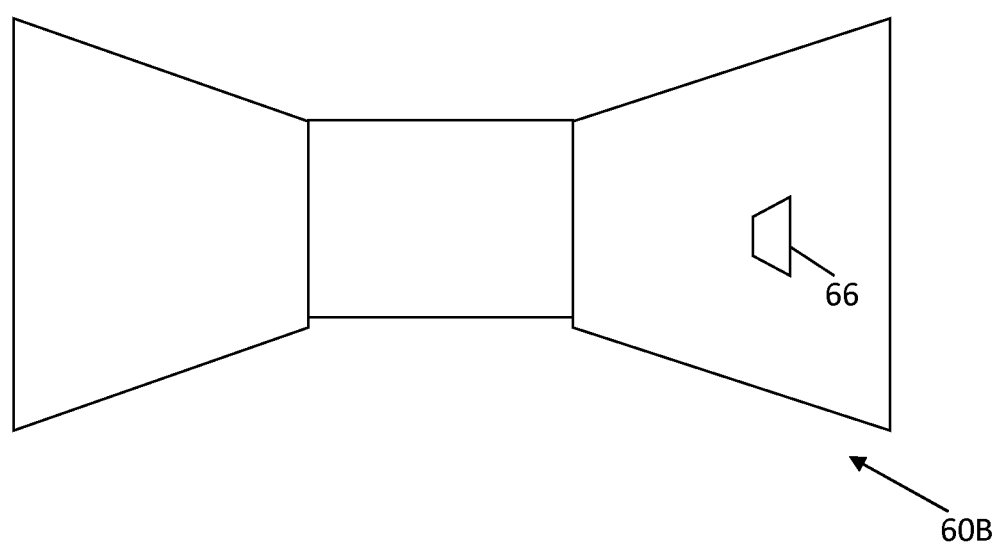

FIG. 7A and FIG. 7B show representations of a first scene in accordance with an example embodiment. FIG. 7A shows a top view of the first scene, indicated generally by the reference numeral 60A. FIG. 7B shows a user view of the first scene, indicated generally by the reference numeral 60B. The first scene may be in a virtual reality environment. The top-view 60A comprises a first interactive object 64 and a user 62 (similar to user 1 described above).

The first interactive object 64 may be a part of an interactive object apparatus, similar to the interactive object apparatus 2 described above. The user view 60B shows a view from the user's current position, i.e. the view of the virtual reality environment, as seen by the user 62. The user view 60B comprises the first interactive object view 66, which is a visual representation of the first interactive object 64 as seen by the user 62. As the user 62 is looking forward (i.e. towards the left side of the figure in FIG. 7A), the first interactive object 64 is visible to the user 62 as a first interactive object view 66.

The first interactive object 64 may be a real interactive object, such as a physical object, an item on a touch screen, or the like. As such, the position of the first interactive object 64, as shown in the top-view 60A may be the real physical position of the first interactive object 64. Alternatively, the first interactive object 64 may be a virtual interactive object, and the position of the first interactive object 64 may be a virtual position of the first interactive object 64. Regardless of whether the first interactive object 64 is a real interactive object or a virtual interactive object, the user 62 is capable of interacting with the first interactive object 64 using virtual reality techniques incorporated in the interactive object apparatus.

Figure 8A:
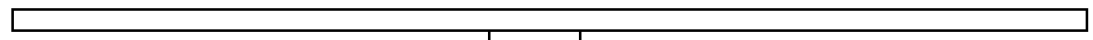
FIG. 8A (top view) and FIG. 8B (user view) show representations of a scene in accordance with an example embodiment.
Figure 8A:
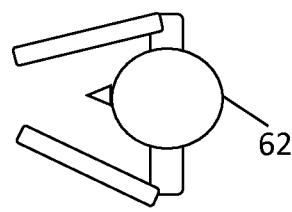
Figure 8A:
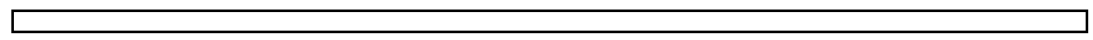
Figure 8B:
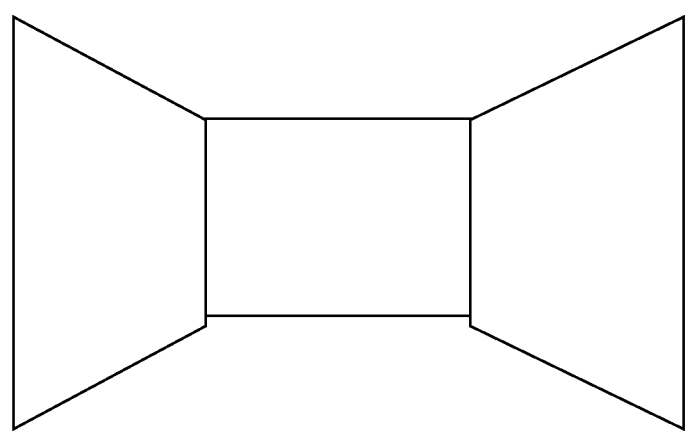

FIG. 8A and FIG. 8B show representations of a second scene in accordance with an example embodiment. FIG. 8A shows a top view of the second scene, indicated generally by the reference numeral 70A. FIG. 8B shows a user view of the second scene, indicated generally by the reference numeral 70B. The second scene may be in a virtual reality environment. The top-view 70A comprises the first interactive object 64 and the user 62. The user view 70B shows a view from the user's current position, i.e. the view of the virtual reality environment, as seen by the user 62. The user view 70B does not comprise any view of the first interactive object 64 as seen by the user 62. As the user 62 is looking forward (i.e. towards the left side of the figure in FIG. 8A), and the user 62 has moved from the position shown in the first scene 60A, the first interactive object 64 is not visible to the user 62 as the first interactive object 64 is behind the user 62 in the current position of the user 62.

In one example, when the user 62 is in the position shown in the first scene 60A, it may be easy for the user 62 to interact with the first interactive object 64, as the first interactive object 64 is visible to the user as first interactive object view 66. When the user 62 is performing other tasks in the virtual reality environment, the user 62 may not need to look elsewhere or change their position in order to interact with the first interactive object 64.

However, when the user has moved to the position shown in the second scene 70A, the first interactive object 64 is no longer visible to the user 62. The user 62 may then be required to turn around and look at or point specifically at the first interactive object 64 in order to interact with the first interactive object 64. This may be distracting and cumbersome for the user 62, and may cause disruption in other tasks being performed by the user 62 in the virtual reality environment.

Figure 9A:
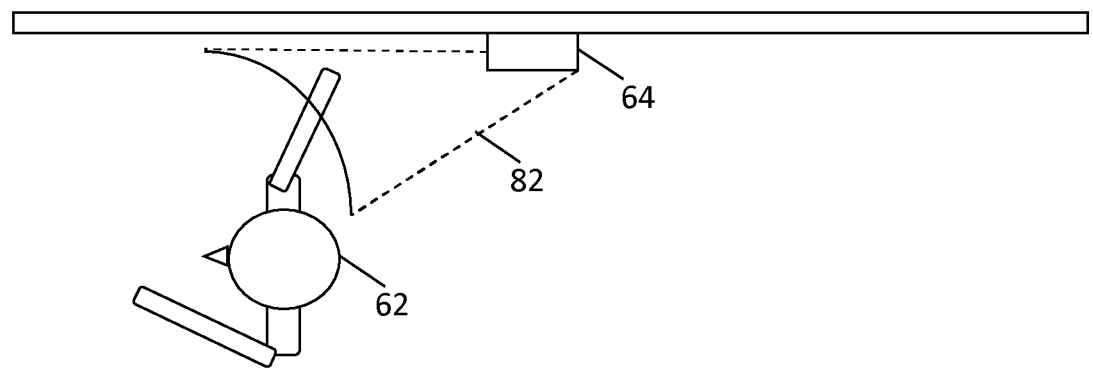
FIG. 9A (top view) and FIG. 9B (user view) show representations of a scene in accordance with an example embodiment.
Figure 9A:
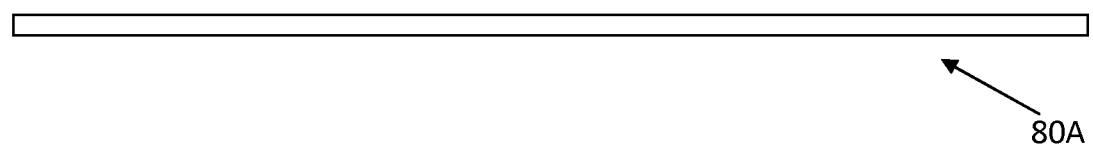
Figure 9B:
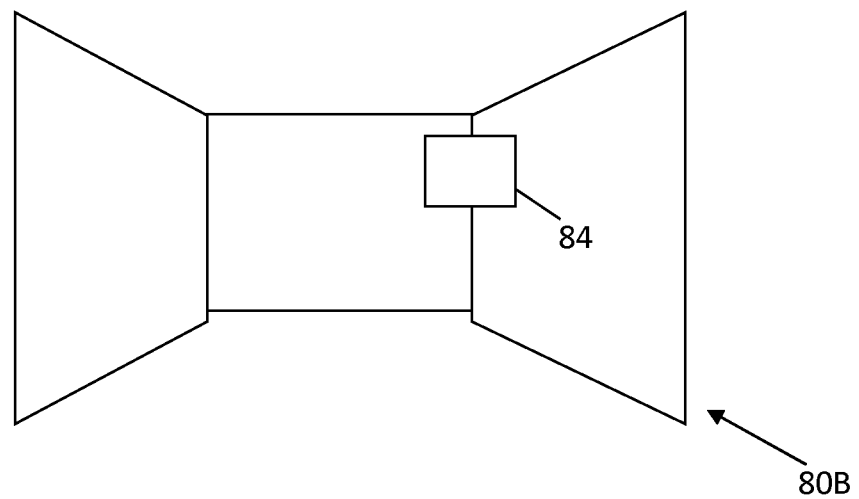

FIG. 9A and FIG. 9B show representations of a third scene in accordance with an example embodiment. FIG. 9A shows a top view of the third scene, indicated generally by the reference numeral 80A. FIG. 9B shows a user view of the third scene, indicated generally by the reference numeral 80B. The third scene may be in a virtual reality environment. The top-view 80A comprises the first interactive object 64, the user 62, and a first control area 82. The user view 80B shows a view from the user's current position, i.e. the view of the virtual reality environment, as seen by the user 62.

Viewing in conjunction with FIG. 5, when a user indication is received from the user 62 (operation 11), the first interactive object 64 is added to the interactive object queue (operation 12) and the first control area 82 is provided to the user 62 (operation 13). The first control area 82 is corresponding to the first interactive object 64, such that the user 62 may be capable of interacting with the first interactive object 64 by pointing towards, or being within, the first control area 82 (operation 14). As such, since the user 62 is not required to look at or point directly towards the first interactive object 64, the user is less likely to be disrupted while performing other tasks in the virtual reality environment. The first control area 82 may be provided in the general direction of the first interactive object 64. However, this is optional, such that the first control area 82 may be provided in any direction in the vicinity of the user 62.

In one example, after adding the first interactive object 64 to the interactive object queue, a view of the first interactive object, such as first interactive object view 84, is added to the user's view, as shown in the user view 80B. The position of the first interactive object view 84 may not necessarily be the same to the real position of the first interactive object 64, as the first interactive object 64 may not be visible to the user 62 in the position shown in scene 80A when the user is looking forward (i.e. towards the left side of the figure of FIG. 9A). The first interactive object view 84 may be added to the user view 80B in order to indicate to the user that the first interactive object 64 is in the interactive object queue. As such, if there is a plurality of interactive objects in the interactive object queue, an interactive object view for each of the plurality of interactive objects may be added to the user view 80B. In one example, when the user 62 is fully or partially within the first control area 82 (operation 14), the at least one feedback is provided to the user 62 (operation 15) by increasing the size of or making any other visual changes to the first interactive object view 84. As such, if there is a plurality of interactive objects in the interactive object queue, changes are only made to the first interactive object view 84, and the other interactive object views remain the same.

In one example, in addition to providing a view of the interactive object in the user view 80B, a visual representation of the control area is also provided to the user in the user view 80B. This may be beneficial for allowing the user to determine the general direction or size of the control area.

There may be various practical uses of the techniques described in the example embodiments.

In one example, the interactive object apparatus described herein, similar to the interactive object apparatus 2, may be used in an industrial factory or warehouse. In a factory, there may be many machines which may be controlled using virtual reality techniques. The machines may be associated with one or more interactive objects. For example, the user may use controllers or gestures for controlling the physical machines in a virtual reality interface. In a large factory, for example, it may be cumbersome and inefficient for a user to control each machine by directly looking or pointing at the machines. The user, similar to user 62, may move along the aisles in a factory, and add desired interactive objects to the interactive object queue. The user may be on the move while interacting with interactive objects in the interactive object queue. For example, when the user 62 is in a first aisle comprising a first machine, the user 62 adds a first interactive object 64 to the interactive object queue. The first interactive object 64 may be used for changing configuration of the first machine. The user 62 then moves along the factory to the other aisles, and realizes that the configuration of the first machine must be changed immediately. The user 62 may then point in the first control area 82. After the user 62 receives a feedback indicating that the user is within the first control area 82, the user may send the interaction input and interact with the first interactive object 64. The configuration of the first machine is therefore changed without the user 62 having to go back to the first aisle near the first machine.

In another example, the interactive object apparatus described herein, similar to interactive object apparatus 2, may be used in image or video editing systems. For example, a virtual reality environment may be used for image or video editing. It is known that there are a large number of tools and features for editing or creating images or videos in image or video editing systems. Not all the tools and features may be useful for a user working on a particular project. As such, the user, similar to the user 62 described above, may add one or more interactive objects, corresponding to one or more useful tools or features to the interactive object queue. The one or more useful tools or features may then be easily accessible to the user when required.

In another example, the interactive object apparatus 2 may be used for monitoring audio-visual environments. For example, a user may control streaming of a concert video on television or on the Internet using virtual reality techniques. A concert may comprise a plurality of camera views and a plurality of audio outputs. The user may add one or more interactive objects for selecting or controlling one or more of the camera views and audio outputs for streaming.

In another example, the interactive object apparatus 2 may be used for media consumption. For example, a user may wish to listen to music while exercising. A virtual reality environment may be used for selecting and playing the music. The user may add one or more songs as interactive objects to the interactive object queue, such that the user may select a song without being disrupted from exercising.

Figure 10:
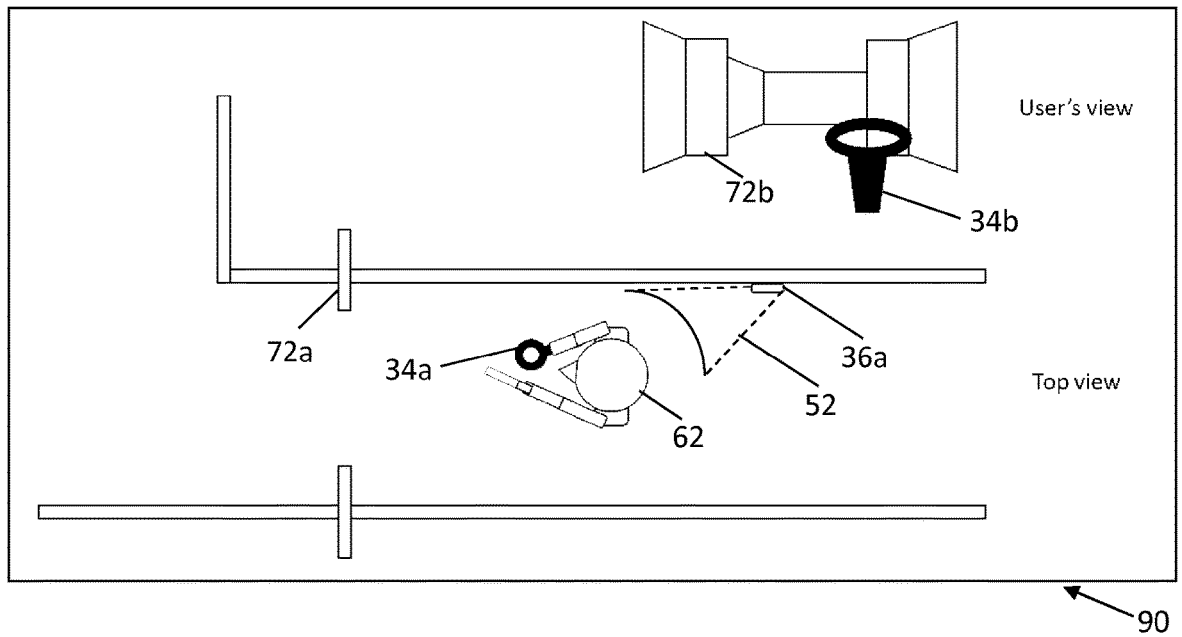
FIGS. 10-13 show representations of a scene in accordance with an example embodiment.

In another example, the interactive object apparatus 2 may be used for moving around a virtual scene (for example, within a computer game in a virtual reality environment). FIG. 10 shows a representation of a fourth scene, indicated generally by the reference numeral 90, in accordance with an example embodiment. The upper part of the fourth scene is a user view, and the lower part of the fourth scene is a top view. The fourth scene shows a virtual reality computer game environment. The fourth scene comprises a door 72a (top view), a door 72b (user view), a user 62, a controller 34a (top view), a controller 34b (user view), a control area 52, and an interactive object 36a (top view). In the current position of the user 62, the interactive object 36a is not visible, and hence is not comprised in the user view. The interactive object 36a may be used for closing the door 72a.

Figure 11:
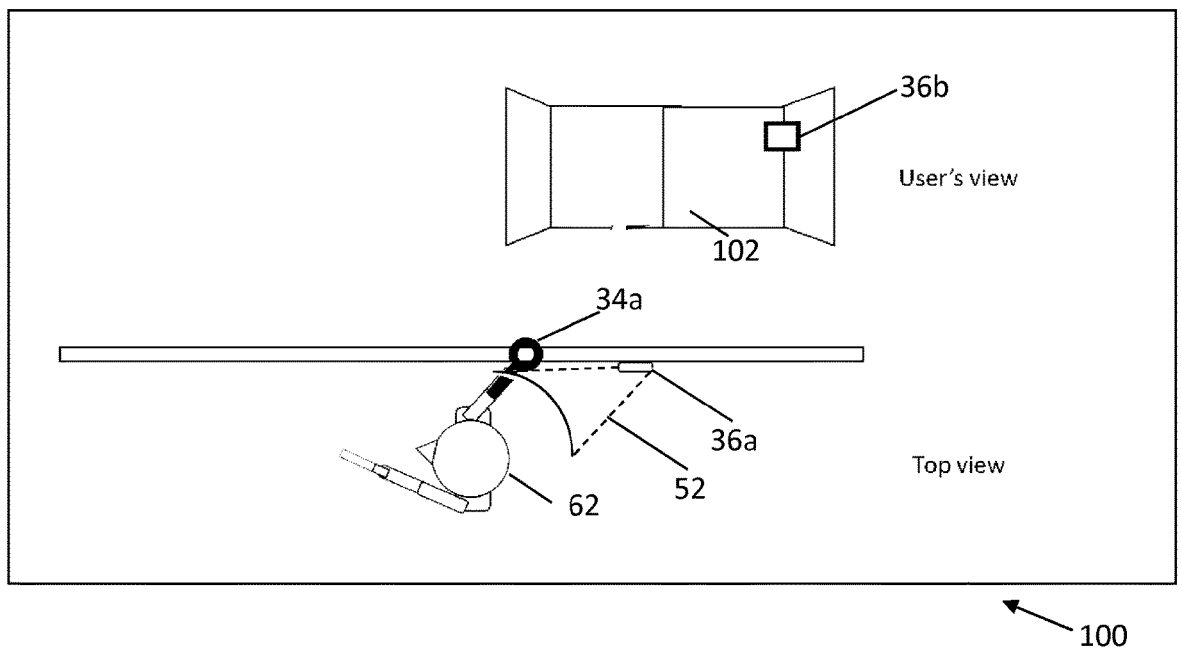

FIG. 11 shows a representation of a fifth scene, indicated generally by the reference numeral 100, in accordance with an example embodiment. The fifth scene 100 shows that when the user 62 may be within or points towards the first control area 52, an interactive object view 36b may be added to the user's view. Furthermore, if the user 62 provides an interaction input while the user 62 is within or pointing towards the first control area 52, the door may be closed, as shown by door 102 (user view of door 72a, not shown in FIG. 1i) in the user view. The usefulness of being able to close a door, for example, is illustrated in FIG. 12.

Figure 12:
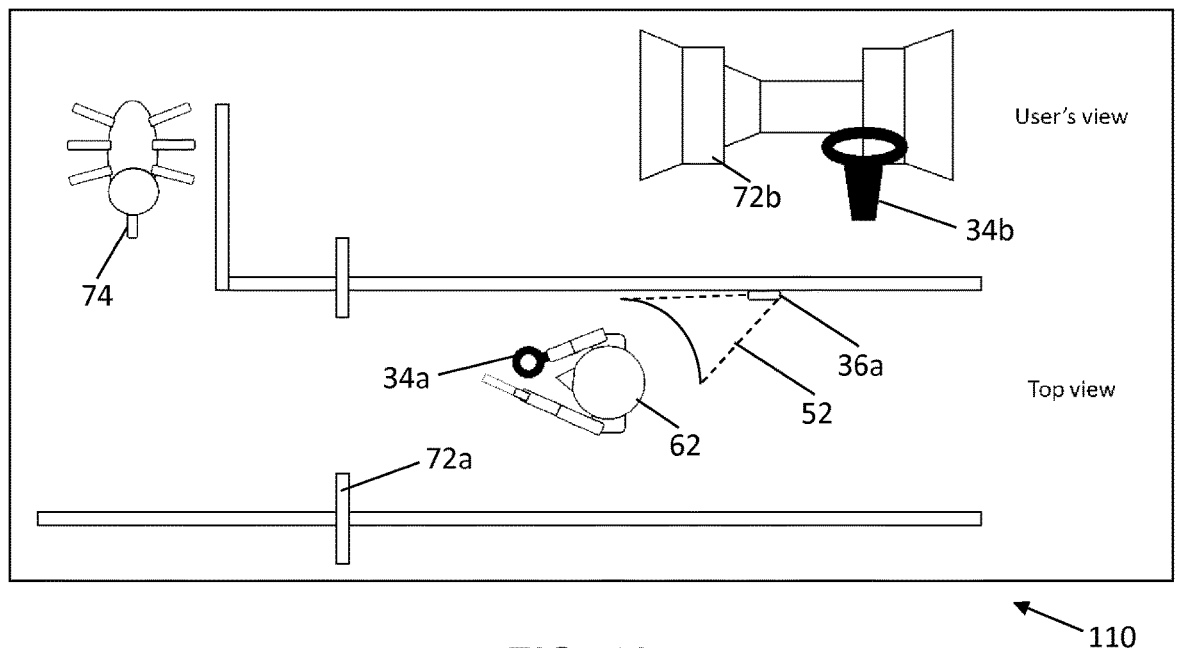
Figure 13:
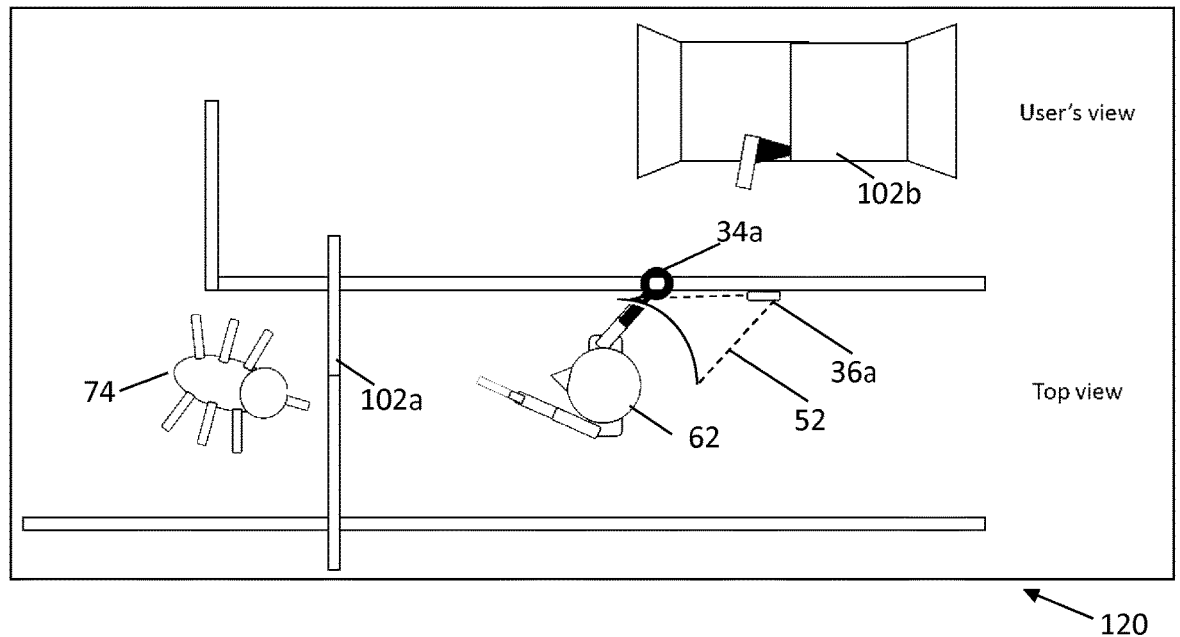

FIG. 12 and FIG. 13 show representations of a sixth and seventh scene, indicated generally by the reference numeral 110 and 120 respectively, in accordance with an example embodiment. For example, in sixth scene 110 a virtual monster 74 within a computer game is approaching the user 62 while the door 72a is open. As soon as the user 62 realizes that the monster 74 is approaching, the user 62 may instantly close the door as shown in the seventh scene 120 (102a in top view of FIG. 13, 102b in user view of FIG. 13) by sending the interaction input in the first control area 52, without having to look towards the first interactive object 36a.

It may be appreciated that there may be various other uses of the interactive object apparatus, and the above examples are for illustration only.

In one example embodiment, the user may add a plurality of interactive objects to the interactive object queue. The interactive objects may have a priority.

In one example, a priority is assigned to the interactive objects based on the time that the interactive object was added to the interactive object queue. For example, an interactive object that has been added most recently may have higher priority. In another example, a priority is assigned to the interactive objects based on the distance of the user from the interactive objects at the time of adding the interactive objects to the interactive object queue. For example, the distance between the user and a first interactive object was a first distance when the first interactive object was added to the interactive object queue, and the distance between the user and a second interactive object was a second distance when the second interactive object was added to the interactive object queue. If the first distance is shorter than the second distance, the priority of the first interactive object may be higher than the second interactive object. Alternatively, if the first distance is longer than the second distance, the priority of the first interactive object may be higher than the second interactive object.

In another example, a priority is assigned to the interactive objects based on user preference, such that the user may assign priority to the interactive objects.

In yet another example, a priority is assigned to the interactive objects based on system determined relevance, such that interactive objects which are judged by the system to be most relevant for the user's current situation and/or task and/or position have a higher priority.

In one example, the control area provided for each interactive object may differ based on priority. For example, when an interactive object has higher priority, the corresponding control area may be larger.

In one example, the view of the interactive objects provided in the user view may differ based on the priority of the interactive objects. For example, when an interactive object has higher priority, the corresponding user view may be larger.

In one example, the interactive object queue may have a limited number of interactive objects. If the number of interactive objects added by the user exceeds the limited number, the interactive objects with lower priorities may be removed from the interactive object queue. In one example, one or more interactive objects may be removed from the interactive object queue based on user preference, or based on priority.

Figure 14A:
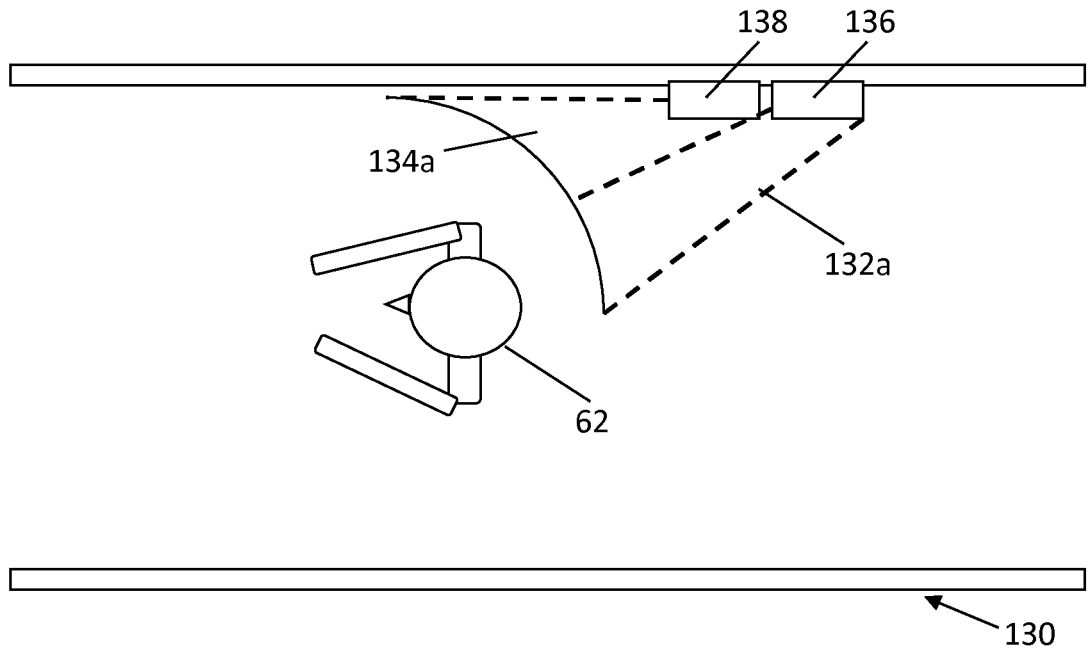
FIG. 14A and FIG. 14B show representations of a scene in accordance with example embodiments.
Figure 14B:
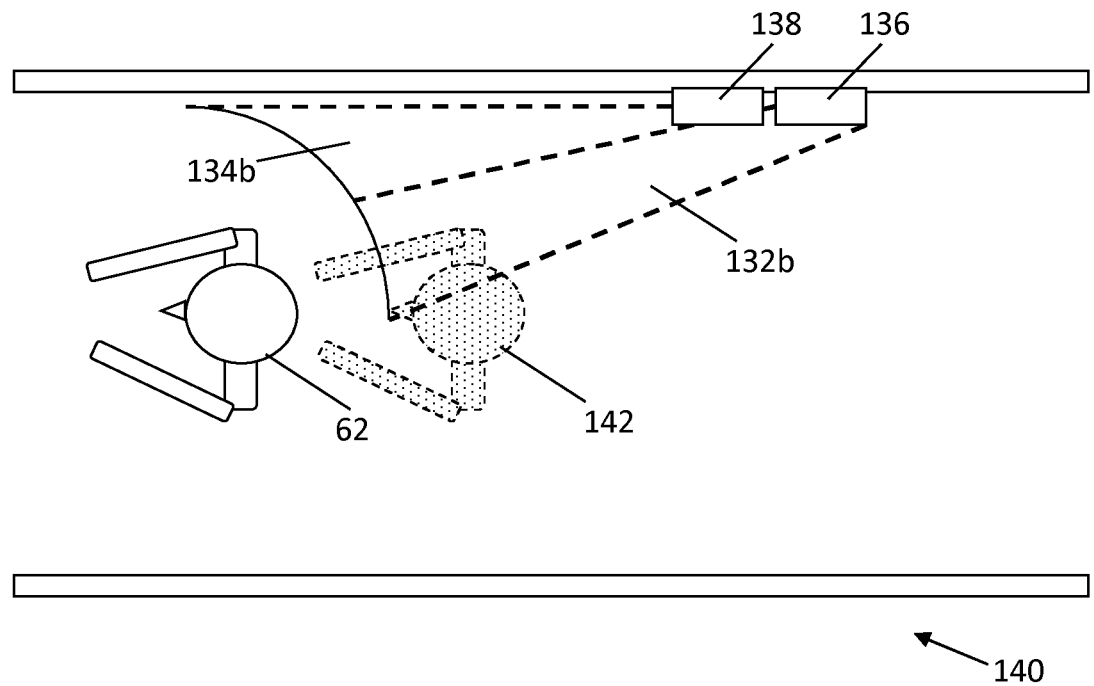

FIGS. 14A and 14B show a representation of an eighth scene and ninth scene respectively, indicated generally by the reference numeral 130 and 140 respectively, in accordance with an example embodiment. The scene 130 is a top view comprising a first interactive object 136, a second interactive object 138, a user 62, a first control area 132a and a second control area 134a. The scene 140 is a top view comprising the first interactive object 136, the second interactive object 138, the user 62, a first control area 132b, a second control area 134b, and a previous user position 142. The scene 140 shows that the user 62 has moved from the previous user position 142 towards the left of the figure of FIG. 14B. Consequently, the control areas have changed from the first control area 132a to the first control area 132b, and the second control area 134a to the second control area 134b. This allows the user 62 to be able to interact with the first and second interactive objects 136 and 138 even after or while moving.

It should be noted that, when there are a plurality of interactive objects in the interactive object queue, their corresponding control areas may be provided such that they do not overlap.

Figure 15:
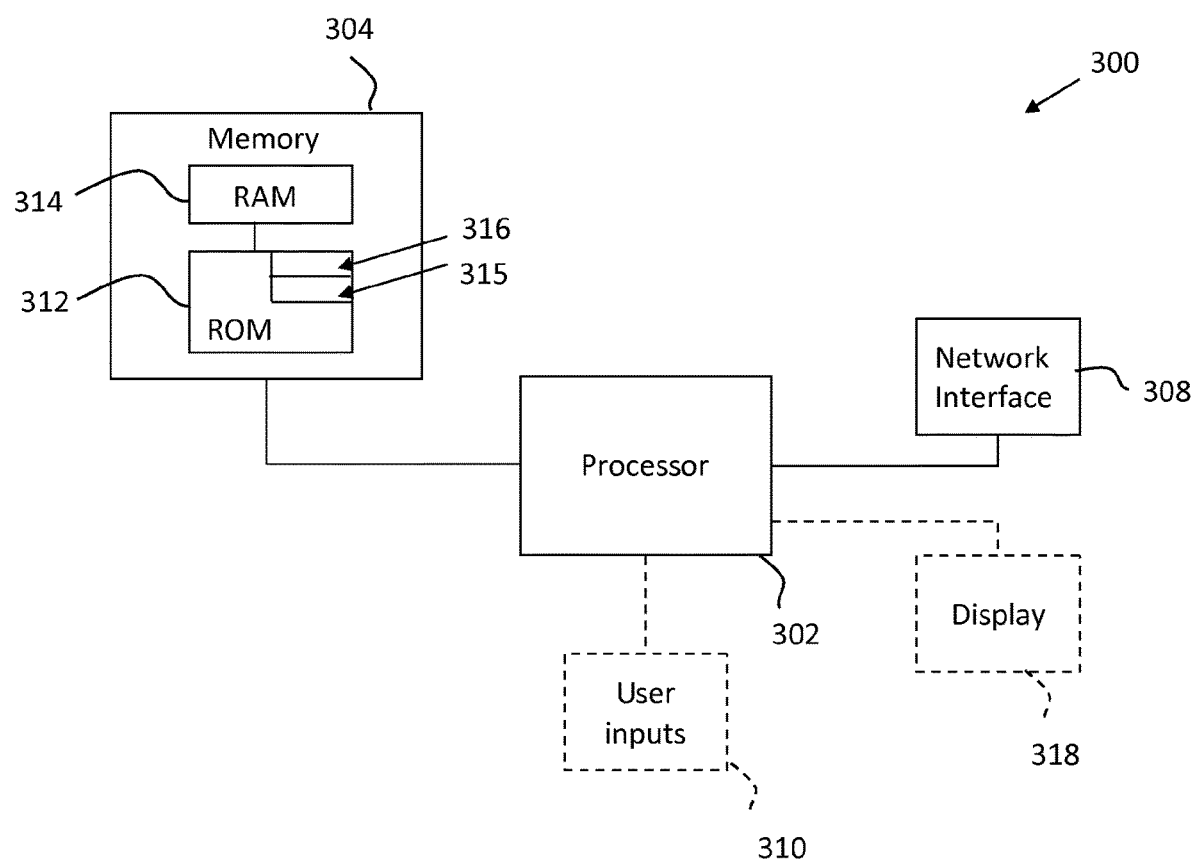
FIG. 15 is a block diagram in accordance with an example embodiment.

For completeness, FIG. 15 is a schematic diagram of components of one or more of the example embodiments described previously, which hereafter are referred to generically as a processing systems 300. The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30, 40, and 50 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 16A:
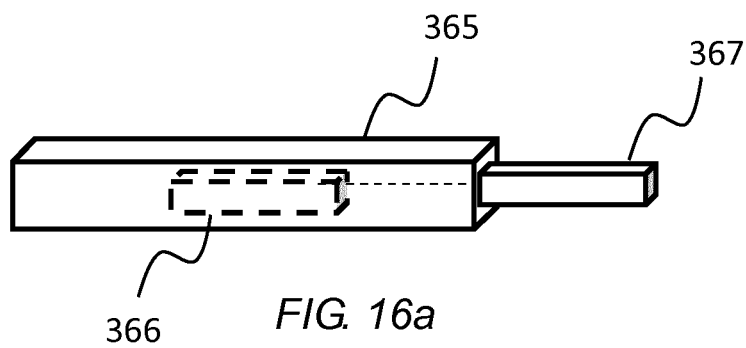
FIGS. 16a and 16b show tangible media, respectively a removable memory unit and a compact disc (CD) storing computer-readable code which when run by a computer perform operations according to embodiments.
Figure 16B:
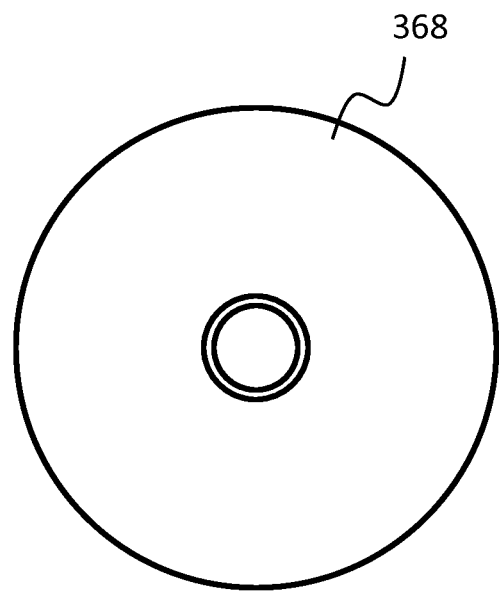

FIGS. 16A and 16B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4, 5, and 6 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one non-transitory memory including computer program code,
   the at least one non-transitory memory and the computer program code configured to, with the at least one processor, cause the apparatus to perform at least the following:
   add an interactive object to an interactive object queue in response to a user indication to add the interactive object to the interactive object queue, wherein the interactive object comprises a virtual object;

provide a first control area, corresponding to the interactive object, in response to the interactive object being added to the interactive object queue;

modify the first control area to be continuously accessible to the user in response to a movement of the user away from the interactive object, wherein at least one of a size or a shape of the first control area is modified relative to the user;

determine whether the user is at least partially within the first control area while the interactive object is outside a field of vision of the user; and provide feedback to the user in response to determining that the user is at least partially within the first control area.

2. The apparatus as claimed in claim 1, wherein the adding the interactive object to the interactive object queue comprises the at least one non-transitory memory and the computer program code are configured to with the at least one processor, cause the apparatus to:

determine a user gaze towards the interactive object, wherein the user gaze is the user indication.

3. The apparatus as claimed in claim 2, wherein the determining the user gaze comprises the at least one non-transitory memory and the computer program code are configured to with the at least one processor, cause the apparatus to determine at least one of whether:

the interactive object is in the field of vision of the user for at least a first threshold time period, or a distance between the user and the interactive object is lower than a first threshold distance.

4. The apparatus as claimed in claim 1, wherein the at least one non-transitory memory and the computer program code are configured to, with the at least one processor, cause the apparatus to:

receive an interaction input from the user, wherein the interaction input is configured to cause interaction with the interactive object, wherein the interaction input comprises an interaction input with respect to the first control area.

5. The apparatus as claimed in claim 1, wherein the first control area does not overlap with at least one existing control area corresponding to at least one existing interactive object in the interactive object queue.

6. The apparatus as claimed in claim 1, wherein the at least one memory and the computer program code are further configured to, with the at least one processor, cause the apparatus to remove at least one interactive object from the interactive object queue.

7. The apparatus as claimed in claim 6, wherein the at least one interactive object is removed when the user does not interact with the at least one interactive object for a second threshold time period.

8. The apparatus as claimed in claim 1, wherein the at least one non-transitory memory and the computer program code are further configured to, with the at least one processor, cause the apparatus to provide a visual representation of the interactive object to a view of the user, wherein the visual representation is configured to indicate that the interactive object has been added to the interactive object queue.

9. The apparatus as claimed in claim 8, wherein a size of the visual representation of the interactive object is increased when adding the interactive object to the interactive object queue.

10. The apparatus as claimed in claim 1, wherein the at least one non-transitory memory and the computer program code are further configured to, with the at least one processor, cause the apparatus to provide a visual representation of the first control area to the user.

11. The apparatus as claimed in claim 1, wherein the at least one non-transitory memory and the computer program code are further configured to, with the at least one processor, cause the apparatus to notify the user when the interactive object is added to the interactive object queue.

12. The apparatus as claimed in claim 1, wherein the at least one non-transitory memory and the computer program code are further configured to, with the at least one processor, cause the apparatus to:

receive a rejection input from the user within a third threshold time period after adding at least one interactive object to the interactive object queue; and remove the at least one interactive object from the interactive object queue on receipt of the rejection input.

13. A method comprising:

adding an interactive object to an interactive object queue in response to a user indication to add the interactive object to the interactive object queue, wherein the interactive object comprises a virtual object;

providing a first control area, corresponding to the interactive object, in response to the interactive object being added to the interactive object queue;

modifying the first control area to be continuously accessible to the user in response to a movement of the user away from the interactive object, wherein at least one of a size or a shape of the first control area is modified relative to the user;

determining whether the user is at least partially within the first control area while the interactive object is outside a field of vision of the user; and providing at least one feedback to the user in response to determining that the user is at least partially within the first control area.

14. The method as claimed in claim 13, wherein the adding the interactive object to the interactive object queue comprises determining a user gaze towards the interactive object, wherein the user gaze is the user indication.

15. The method as claimed in claim 14, wherein the determining the user gaze comprises determining at least one of whether: the interactive object is in the field of vision of the user for at least a first threshold time period, or a distance between the user and the interactive object is lower than a first threshold distance.

16. The method as claimed in claim 13, further comprising:

receiving an interaction input from the user, wherein the interaction input is configured to cause interaction with the interactive object, wherein the interaction input comprises an interaction input with respect to the first control area.

17. The method as claimed in claim 13, wherein the providing the first control area comprises providing the first control area such that the first control area does not overlap with at least one existing control area corresponding to at least one existing interactive object in the interactive object queue.

18. The method as claimed in claim 13, further comprising removing at least one interactive object from the interactive object queue.

19. The method as claimed in claim 18, wherein the at least one interactive object is removed when the user does not interact with the at least one interactive object for a second threshold time period.

20. A non-transitory computer readable medium comprising program instructions stored thereon for performing at least the following:
- adding an interactive object to an interactive object queue in response to a user indication to add the interactive object to the interactive object queue, wherein the interactive object comprises a virtual object;
- providing a first control area, corresponding to the interactive object, in response to the interactive object being added to the interactive object queue;
- modifying the first control area to be continuously accessible to the user in response to a movement of the user away from the interactive object, wherein at least one of a size or a shape of the first control area is modified relative to the user;
- determining whether the user is at least partially within the first control area while the interactive object is outside a field of vision of the user; and
- providing at least one feedback to the user in response to determining that the user is at least partially within the first control area.

* * * * *